May 25, 1954      F. STUHLMAN      2,679,599
SPOT FILM TUNNEL Filed Sept. 17, 1951      4 Sheets-Sheet 1

INVENTOR.
Frank Stuhlman
BY Donald E. Moehling
Attorney

May 25, 1954  F. STUHLMAN  2,679,599

SPOT FILM TUNNEL

Filed Sept. 17, 1951  4 Sheets-Sheet 3

INVENTOR.
Frank Stuhlman
BY: Donald E. Moehling
Attorney

May 25, 1954 F. STUHLMAN 2,679,599
SPOT FILM TUNNEL
Filed Sept. 17, 1951 4 Sheets-Sheet 4

INVENTOR.
Frank Stuhlman
BY: Donald E. Moehling
Attorney

Patented May 25, 1954

2,679,599

UNITED STATES PATENT OFFICE 2,679,599

SPOT FILM TUNNEL

Frank Stuhlman, Forest Park, Ill.

Application September 17, 1951, Serial No. 246,976

13 Claims. (Cl. 250—66)

This invention relates to apparatus useful in the art of X-ray photography, particularly in conjunction with fluoroscopic examination of the object being photographed. More specifically, the invention concerns a spot film tunnel device for obtaining multiple X-ray exposures on different portions of a photographic plate.

In the art of X-ray photography, particularly as an aid in diagnostic examinations of internal human disorders, such as stomach ulcers, the fluoroscopist in many instances desires to obtain a series of distinct X-ray radiographs in rapid succession and as nearly contemporaneous with a visual fluoroscopic examination of the object as possible, thereby obtaining a permanent record of the examination during a succession of mutations in the object or to obtain a record of the object in one of its transitory phases. It is also desirable to have the record of a successive series of changes in the object on a single photographic plate, thus presenting to the examining physician the series of changes in the same relative orientation to the surrounding objects appearing on the film record, permitting the physician to make a rapid, accurate comparison of the series of changes as an aid in the diagnosis of a patient's condition. By observing, for example, the palpations of a peptic ulcer and recording the observations on a series of contiguous X-ray radiograms, representing various stages in the mutation of the ulcer, the physician has a permanent record of the condition of the patient's ulcer for future reference when a comparison with subsequent developments in the ulcer are desired. A device presently in use in the X-ray radiographic art to produce a single full-plate exposure or a composite of contiguous radiograms on a single film-plate in which the exposure of each view represented on the photograph is timed to be substantially contemporaneous with a visual observation of the patient by a fluoroscopist is an apparatus known generally as a "Spot Film Tunnel." Several apparatus heretofore developed for this purpose resemble the present spot film tunnel in external form and in general operation but differ mechanically, and in the scope and flexibility of operation. These units of presently known design comprise essentially the following general combination of elements or certain mechanical equivalents thereof which accomplish essentially the same function: a substantially flat, shallow housing of rectangular shape having two, generally rectangularly shaped open spaces on the upper or forward flat surface thereof. The opening to the left of center is adapted to hold a lead glass plate and a fluorescent screen behind it for visual fluoroscopic observations by the examining physician of the patient standing behind the opening or lying beneath it between the rear or bottom side of the tunnel and the source of X-ray radiations. The second opening to the right of center on the forward or top face of the tunnel is of sufficient size to permit the insertion of a cassette containing an unexposed photographic plate into a cassette holder or supporting member preparatory to making a succeeding X-ray exposure; the latter, second opening may thus be designated the loading or "idle" position of the cassette holder in accordance with the function it serves in the apparatus as a whole. The cassette holder is mounted on rollers or sliding elements which ride on a pair of horizontal tracks within the apparatus and carry the cassette holder from the right to the left side of the tunnel, or from the cassette loading to the cassette active position. The extent of horizontal movement of the cassette holder may be varied by suitable stop elements within the housing and although provision has thereby been made in the units heretofore developed for selecting a number of horizontal positions of the cassette with respect to the source of X-rays, no corresponding series of stop elements have been provided in the mechanism of presently known spot film tunnels for varying the vertical position of the cassette in the housing with respect to the source of X-rays. Hence, in order to expose the four quadrants of a rectangularly shaped film plate, the horizontal position of the cassette holder must be adjusted to expose one half of either the upper or lower half of the film plate, then the other horizontally adjacent half of the upper or lower half, followed by turning the photographic plate 180°, reinserting the plate in the cassette holder, and thereafter successively exposing the remaining unexposed adjacent horizontal halves while the cassette is in the latter position.

The horizontal movement of the cassette holder from the loading or idle position to the two active positions is generally effected in prior art devices by means of a stretched coil spring which becomes extended when the cassette holder is moved to its loading position on the right side of the housing and which retracts when the cassette holder is released from its idle position, thereby drawing the holder and the unexposed film it contains across the horizontal tracks in the housing to an active position before the opening occupied by the fluorescent screen preparatory to exposure thereof by X-rays. The apparatus is usually fitted with shutter controls which open the X-ray tube shutter mechanism to the correct picture size in preparation to exposing the photographic film to the X-rays passing through the object to be examined at the moment the cassette arrives at its predetermined active position. Various switches usually incorporated into present spot film tunnels, close the appropriate electrical circuits supplying increased voltage and amperage to the X-ray tube when the cassette holder is released from its loading or idle position. The time interval required for travel of the cassette holder from the idle position to its active position where exposure of the film is possible is predetermined by the latter shutter controls as the time required to energize the X-ray tube filament sufficiently to increase the intensity of X-ray emission from a relatively low level suitable for fluoroscopic examination to an increased lever suitable for exposure of the photographic film plate with the desired image of the object under examination.

Although spot film tunnels having the above general design and operating characteristics are presently in use, and, in general, are capable of being operated to obtain multiple exposures on a single photographic film plate, either in the four separate quadrants of the film plate or in its adjacent halves, the prior art devices for this purpose are not capable of exposing the four quadrants of each film plate from the same perspective relative to the object under examination. The developed radiogram is, at most, a composite of 4 individual exposures one in each of the quadrants of the rectangularly shaped film in which each pair of horizontal quadrants is viewed from opposing perspectives, the result of exposing the upper adjacent pairs of quadrants in succession, turning the cassette through an angle of 180° and thereafter exposing the remaining horizontal pair of quadrants in succession. The completed radiogram composite of four quadrants thus presents to the examining physician, the two successive horizontal pairs of quadrants in upside down relationship of each pair to the other. To be viewed in the sequence and from the perspective in which the exposures of the object before the fluorescent screen were actually taken, the physician must again turn the radiogram composite through a 180° angle. When the objective of the physician is to record the four exposures during a series of mutations in the object under examination, the rotation of the radiogram composite requisite to a proper inspection of the exposures interrupts the stepwise comparison of the four views of the object, an obvious disadvantage when the mutations are slight and difficult to find, although critical to a proper diagnosis of a patient's condition.

The ability of prior spot film tunnel devices to obtain successive exposures in two of the adjacent horizontal quadrants is based upon provisions in the design of the mechanism which permit the cassette holder and the film plate it contains to move various distances horizontally into the X-ray beam and into positions in which each quadrant is successively between the source of X-ray radiations and the object being photographed. On the other hand, the inability of the prior spot film tunnel devices to expose both the upper and lower pairs of film plate quadrants sucsessively without inverting the cassette between the successive horizontal pairs of exposures arises from the lack of provision for vertical movement of the cassette holder which would allow both the upper and lower adjacent pairs of quadrants to be placed in the path of the X-rays without inverting the cassette.

The necessity of removing the cassette from its holder after exposing the adjacent quadrants of one half of the film plate, turning the cassette through 180°, re-inserting the cassette in its holder and finally exposing the remaining adjacent quadrants in the other half of the film plate is an obvious interruption in the progress of preparing the entire composite of four exposures and constitutes a considerable disadvantage when it is desired to record photographically four stages of a series of mutations of the object under examination in a corresponding series of four exposures. As is frequently the case in the examination of a diseased or malfunctioning internal organ of a human patient, the mutations in the organ or other disorder do not recur in the same sequence or in the same form and the failure to obtain an exposure in each stage of the series of mutations may represent a serious deficiency of the spot film tunnel.

The improved spot film tunnel of the present invention incorporates the aforementioned desirable means for both vertical and horizontal movement of the cassette and may be designed to permit exposure of the rectangular film in each of the four quadrants individually, either the vertical or horizontal halves individually, or the entire photographic film with the longitudinal axis of the film in either a vertical or a horizontal position with respect to the cassette holder; furthermore, each picture section is centered with respect to the X-ray beam. Thus, provision may be made for exposing either the entire film with the longitudinal axis of the film positioned and centered either vertically or horizontally in the cassette holder, each of the two halves with the longitudinal axis being either vertically or horizontally disposed in the cassette holder, or each of the four quadrants, the longitudinal axes of which are either vertical or horizontal. Furthermore, the images in the developed photographic plate composite are in the same relative position on the film as the object photographed occupied when the exposures were made.

The present spot film tunnel apparatus represents a further improvement in the art of X-ray radiography in that means are provided in the present device for moving the cassette from its idle or loading position to its active positions at a controlled rate of motion, such that when the movement of the cassette terminates at its destination (one of the active positions) the sudden cessation of motion does not cause vibration of the spot film tunnel at the moment exposure of the film plate is desired. The fluoroscopist, therefore, is not required to wait any appreciable interval of time after the cassette has moved into one of its active positions before exposure of the cassette can be made to obtain a clear, photographic image of the object under examination.

In one of its embodiments the present invention concerns an improved spot film tunnel apparatus adapted to obtain multiple successive exposures in separate portions of a rectangular photographic film, comprising a housing, a cassette holder movable horizontally in said housing from a cassette idle position to at least one horizontal active position adjacent said idle position, and cassette horizontal positioning means in said housing, said improvement comprising cassette vertical positioning means in said housing.

A more specific embodiment of the invention relates to an improved spot film tunnel comprising a housing, a cassette holder movable in said housing, and a cassette horizontal position control means within said housing, said improvement comprising a cassette carriage frame horizontally movable in said housing containing said cassette holder vertically movable therein, a bell crank lever having substantially horizontal and substantially vertical arms rotatable about a pivot fixed to said cassette holder, stepped shoulders on said substantially vertical arm for determining vertical motion of said cassette holder in said frame, a rotatable depressor arm communicating with said substantially horizontal arm of said bell crank lever, a substantially straight rocker arm pivotally connected to said housing and containing stepped shoulders which determine horizontal motion of said carriage frame, a cassette vertical motion stop spur fixed to said cassette holder and adapted to communicate with the stepped shoulders on the vertical arm of said bell crank lever, a carriage frame horizontal stop projection fixed to said frame and adapted to communicate with the stepped projections of said substantially straight rocker arm, means urging horizontal motion of said frame and vertical motion of said cassette holder in said frame, an axle rotatable in said housing, a cam wheel keyed to said axle and having periferal cam projections thereon, a second cam wheel keyed to said axle and having periferal cam projections thereon, a rachet wheel keyed to said axle, a rachet wheel lifter arm designed and positioned to communicate with a depressor cam mounted on said cassette carriage frame, means urging said lifter bar to a raised, depressable position, a cam follower bar rotatable about a fixed pivot at one end of said bar and communicating with said cam wheel projections, a second cam follower bar rotatable about a fixed pivot at one end of said bar and communicating with said second cam wheel projections, and means connecting said first and second cam follower bars to said rocker arm and to said bell crank lever, said cam wheel projections determining particular shoulders on said rocker arm and the vertical arm of said bell crank lever communicating with the carriage frame stop projection and the cassette holder stop spur respectively.

The accompanying drawings illustrate the improved spot film tunnel of the present invention in one of its specific embodiments and the description thereof which follows explains its operation and describes other embodiments within the scope of this invention.

Figure 1:
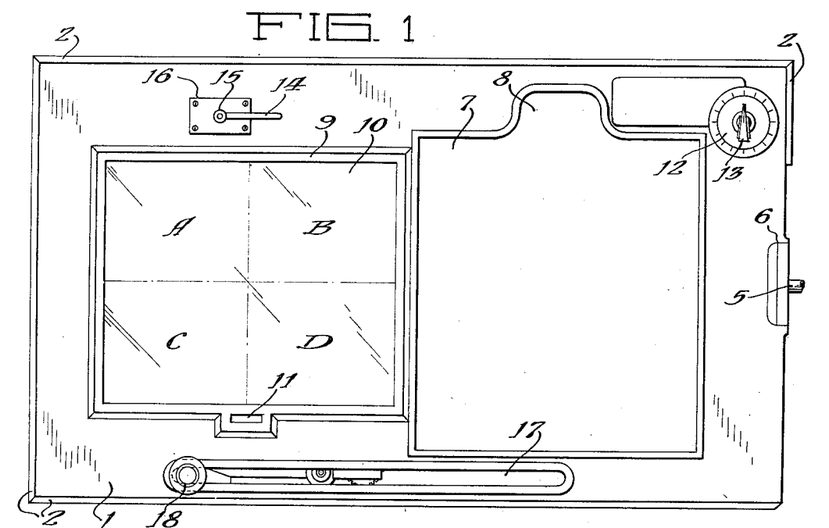
Figure 1 is a front elevational view of the present spot film tunnel.
Figure 2:
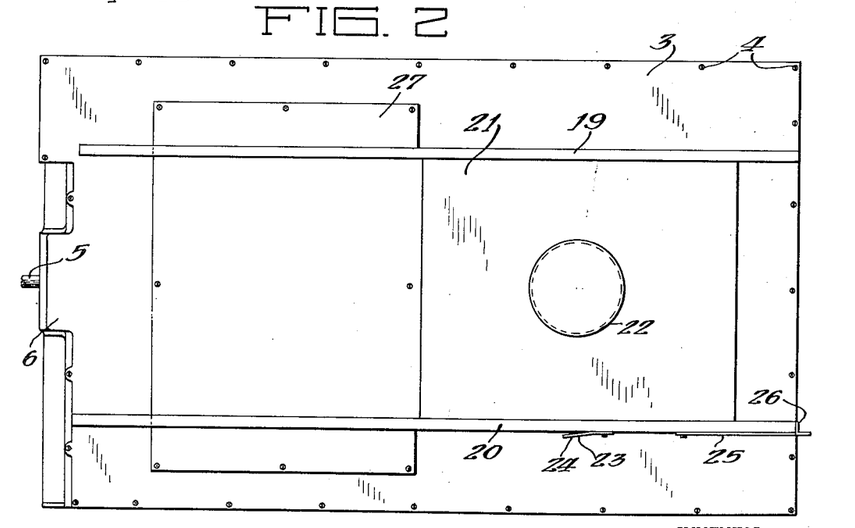
Figure 2 is the rear elevation of the same apparatus completely enclosed in the housing surrounding a major portion of the operating mechanism.

Referring more specifically to Figures 1 and 2 of the drawings which illustrate the exterior of the present spot film tunnel, the housing comprises a 6-sided, rectangularly-shaped, shallow, generally box-like structure having a front or upper side 1, and side walls 2 which preferably flare outwardly toward the rear or bottom side 3 illustrated in the rear elevation view shown in Figure 2. The front and side walls 2 may be fabricated from any suitable structurally rigid material but desirably are cast in one piece of a strong, light weight material, such as aluminum. The rear side 3 which comprises in general, a removable cover for the housing, and when removed, permits inspection of the inner mechanism of the apparatus, is fastened to side walls 2, for example, by means of screws 4 suitably spaced along the outer-edge of the cover 3. The present spot film tunnel is a compact mechanism which may be mounted on an X-ray fluoroscopic unit and is preferably removable therefrom by simple means. One arrangement for such purpose is illustrated in Figures 1 and 2, comprising a single supporting bolt 5 rigidly anchored in the housing wall in a recessed bracket 6 which fits over a projection of complementary size and shape on the fluoroscopic unit, thus further serving as a support for the spot film tunnel.

The housing contains two large openings in the front or top face thereof, opening 7 being of a size and shape adapted to accommodate the cassette or photographic film plate when the latter is inserted in its holder preparatory to operation of the apparatus, as hereinafter more fully described; the opening 7 outlines the cassette holder when the latter is in its loading or idle position. A looped space 8 in the upper vertical extremity of the opening 7 is designed to accommodate the hand of the fluoroscopist or operator when the cassette holder is manually forced downwardly to cock the mechanism preparatory to its subsequent operation as hereinafter described. A second opening in the front face of the housing has a flange 9 to retain a fluorescent screen and a lead glass plate 10 impervious to X-ray radiations.

The front face of the housing also desirably contains one or more small openings or windows around the perifery of the fluorescent screen, such as opening 11, containing a fluorescent material which glows by activation from X-ray radiations of even low intensity and, when glowing, informs the fluoroscopist that the shutter controls are not adjusted properly to the size of the screen and that X-rays are escaping around the screen, endangering the safety of the fluoroscopist. The dial 12 and pointer 13 in the upper right hand corner of the housing are designed to indicate the position the cassette will take when the apparatus is put into operation as determined by the cassette carriage release trigger 14, as later described. The latter trigger attached to a shaft 15 rotatably mounted in a journal plate 16 fixed to the front face of the housing extends into the enclosed operating portion of the apparatus as hereinafter described. A slotted opening in the lower portion of the housing is designed to accommodate a shaft, not illustrated in this view of the apparatus, having a knob 18 positioned to be readily within the grasp of the fluoroscopist for return of the cassette horizontally from its active position between fluorescent screen 10 and the source of X-ray radiation to its loading or idle position.

The rear or bottom side of the spot film tunnel comprises a removable cover 3 having attached on the outside surface thereof a pair of spaced, double channelled tracks 19 and 20 which support and retain a Bucky grid slidable in one of the channelled tracks and a compression cone 21, having the projection 22 common to such cones, slidable in the other channelled track.

A flat spring 23 attached at one of its ends to the bottom of the channelled track and exerting upward pressure on a pin 24 projecting through an opening in the track and engaging one of a series of slotted indentations in the bottom of the compression cone determines the setting of the latter with respect to the fluorescent screen 10 when the cone is slid longitudinally across the back or bottom of the apparatus. A second flat spring 25 having a stop projection 26 which fits over the end of the channeled track prevents the compression cone and Bucky grid from sliding out of the channeled track, and by deflection downward permits the removal of the cone and grid from the apparatus. A sheet of lead or other X-ray impermeable material, such as 27 may be fastened to the rear side of the tunnel for the purpose of absorbing X-ray radiations and thereby shield the unexposed film from X-ray radiation during fluoroscopic examination.

Figure 3:
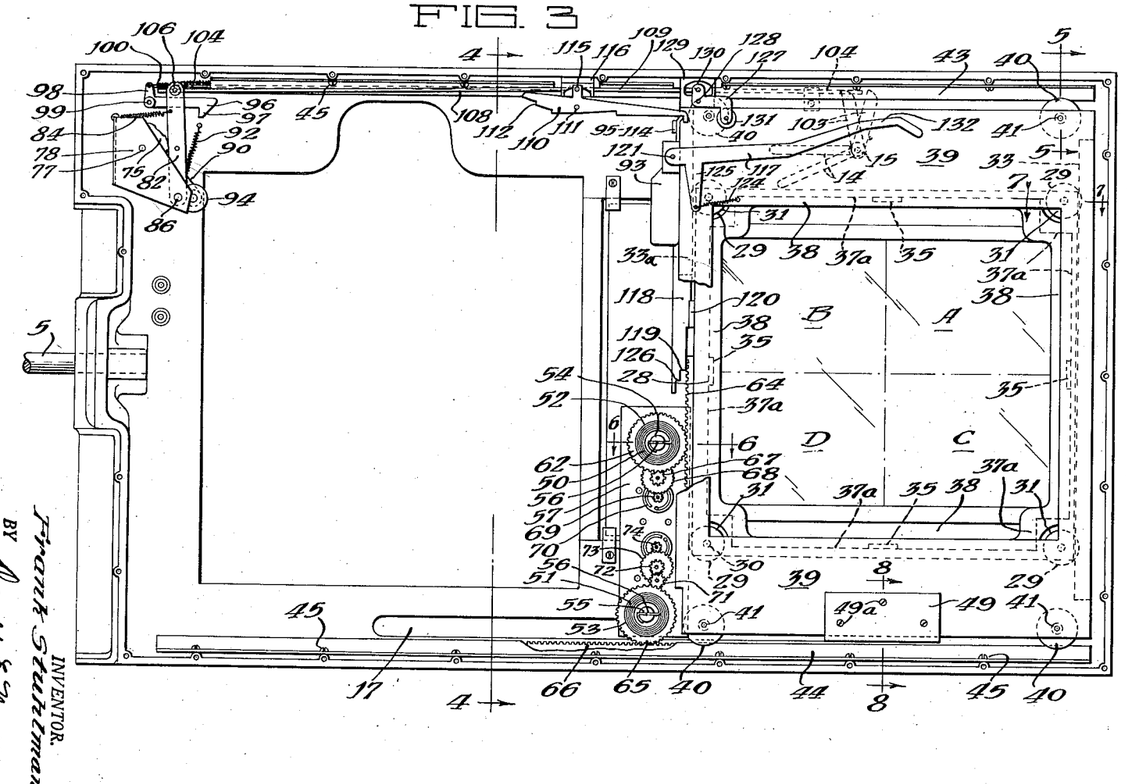
Figure 3 is also a rear elevation view with the removable portion of the housing at the rear or bottom of the apparatus removed to illustrate some of the essential operating parts of apparatus illustrated.

Referring to Figure 3 which illustrates the inner mechanism and principal operating portion of the present spot film tunnel when the rear cover plate 3 on the bottom or rear of the apparatus is removed, the mechanism in general comprises a cassette holder 28 which is adapted to move vertically within a carriage frame 39 therefor and also vertically with respect to the housing, said cassette holder carriage frame also being designed to move within the housing, but in a horizontal plane with respect to said housing. The combination of the movement of the cassette holder 28 with the movement of the carriage frame 39 which carries the cassette holder permits the accurate positioning of the cassette with respect to the source of X-rays or with respect to the compression cone. For some settings of the cassette within the spot film tunnel, the vertical movement of the cassette holder is independent of the horizontal movement of the cassette carriage frame, while in other settings, the vertical and horizontal movements of the cassette holder and cassette carriage frame cooperate to obtain the setting of the cassette within the housing. Depending upon these horizontal and vertical settings of the cassette, exposure of the film may be had in either the entire film plate with the longitudinal axis of the plate either vertical or horizontal, in one of the two vertical or horizontal halves of the film plate (as indicated in Figure 3 by the quadrant pairs: A—B, D—C, B—D or A—C) or in one of the 4 vertical or horizontal quadrants (A, B, C, or D) before the compression cone or X-ray tube. Other portions of the mechanism, as hereinafter described, control the position the cassette is to occupy before the compression cone and, more specifically, which of the quadrants or halves of the cassette is to be exposed by X-ray radiations.

Figure 6:
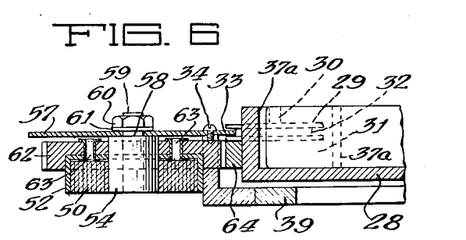
Figure 6 is a vertical view from horizontal section line 6—6 of Figure 3.
Figure 7:
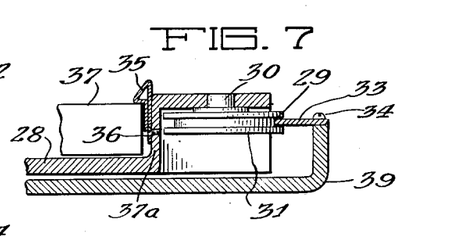
Figure 7 is the vertical view from horizontal line 7—7 of Figure 3.

The cassette holder 28 is a four-sided, shallow, box-like structure adapted to surround and releasably retain a generally flat, oblong cassette and has rollers 29 rotatably mounted in recessed corners 20 thereof, preferably in all four of its corners and with the roller axles 30 perpendicular to the flat plane of the cassette holder, such that the entire assemblage is substantially flat. As illustrated in Figures 6 and 7, the rollers preferably contain a groove 32 around the peripheral surface thereof to ride over a pair of vertical rails attached on each side of the cassette holder carriage frame, indicated in Figure 3 by broken lines 33 and shown in sectional views in Figures 6 and 7. The vertical rail to the left of the cassette in Figure 3 is desirably of two component portions, 33a and plate 57, the vertical, inner edge of which plate serves as the vertical rail for the lower left roller of the cassette holder as well as a support for other members of the present apparatus, as hereinafter described. The upper portion, 33a, of the left vertical rail provides the vertical rail for the upper left roller of the cassette holder member. The groove 32 is also desirably of a size and shape to fit loosely over rail 33, but with insufficient play between the rail and the groove to permit the rollers to slide off the track when the rollers move vertically over the rails.

The vertical rails 33 and 33a are fastened, suitably by means of screws such as 34, to the cassette holder carriage frame in such relationship thereto that the cassette holder may freely move vertically within the carriage frame without coming into contact therewith.

The cassette holder 28 is designed to hold the cassette securely but releasably therein while resting against a flange 38 which, together with the surrounding walls 37a of the recessed enclosure, define a well into which the oblong cassette fits more or less snugly. In order to retain the cassette within the side walls of the enclosure during operation of the mechanism a spring-catch such as 35 is mounted by any appropriate means, for example, by means of screw 36 on each of the four side walls of the cassette holder enclosure, the inwardly projecting detent of the spring catch being compressible to permit the cassette to be readily removed when the latter is forcibly lifted from the recessed enclosure. Since the cassette is customarily an oblong or rectangularly-shaped flat plate, the cassette holder is ordinarily designed to receive the cassette with its longitudinal axis in either horizontal or vertical relationship to the holder and provision is made in the present apparatus for such positions of the cassette by forming the walls 37a of the recessed box-like cassette holder in the shape of intersecting rectangles having a common center and having the flange 38 projecting perpendicularly from the walls so as to hold the cassette within the holder when it is placed with its longitudinal axis either in a horizontal plane or in a vertical plane with respect to the longitudinal axis of the housing. The spring-catches 35 are desirably mounted on each of the four cassette holder walls as aforesaid and although the catch is illustrated as having a detent projection for retaining the cassette within the holder, any other form of retaining means may be substituted for the spring catch suitable for holding the cassette within the recessed well, as for example, a compressible leaf spring attached to one or more of the side walls of the enclosure.

Figure 5:
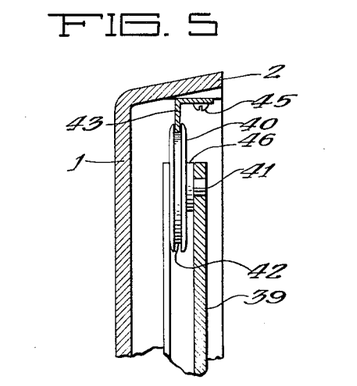
Figure 5 is a horizontal view from vertical section line 5—5 of Figure 3.

The cassette holder carriage frame 39 is a structurally rigid, relatively flat, rectangularly shaped piece which moves horizontally within the housing and is suspended therein on rollers 40 journalled by means of axles 41 to the top and bottom of the carriage frame and offset sufficiently from the horizontal edges of frame 39 to support the frame on axles 41. As indicated in Figure 5, a view from section 5—5 of Figure 3, rollers 40 may be similar to rollers 29, aforementioned, and preferably likewise have a peripheral groove 42 to maintain the cassette holder carriage frame in track as the frame is moved horizontally within the housing on horizontal rails such as top rail 43 and bottom rail 44 which are illustrated as L-shaped channels secured to the top side wall 2 on the inner surface of the housing by means of machine screws 45, although the channels may also be brazed, welded or secured by other well known means to the housing wall. A washer 46 is desirably placed on axle 41 between rollers 40 and carriage frame 39 to allow free motion of the rollers on axles 41 as the frame is moved horizontally along rails 43 and 44.

Figure 8:
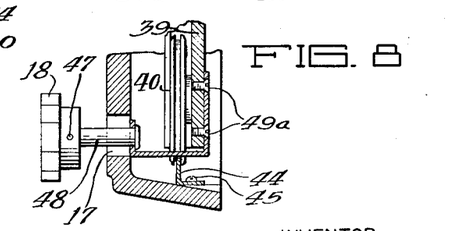
Figure 8 is the horizontal view from vertical section line 8—8 of Figure 3.

The cassette holder carriage frame is returned, following exposure of the photographic film to the X-ray beam, to its idle or loading position by the fluoroscopist manually pushing the knob 18 on the outside of the housing, as hereinbefore described. As illustrated in Figure 8, which represents the sectional view of that portion of the apparatus from section line 8—8, the knob 18 is attached by means of set screw 47 to shaft 48 which extends through horizontal slot 17 into the mechanism on the inside of the housing, and attaches to U-shaped bar 49 which, in turn, is fixed to the cassette holder carriage frame 39 by appropriate securing means, such as machine screws 49a.

The movement of the cassette holder carriage frame horizontally within the housing and the cassette holder vertically within its carriage frame may be accomplished by any suitable means for urging the respective horizontal and vertical motion. A suitable arrangement for this purpose is illustrated in Figure 3 and the accompanying section views in Figures 4, 5, and 6, comprising clock spring motors 50 and 51, retained in circular spring boxes 52 and 53, respectively, which also anchor the movable ends of the springs 50 and 51. The springs are wound about a central axle in each motor 54 and 55 which also conveniently anchor the other ends of springs 50 and 51, for example by retaining the spring ends in slots 56 cut in axles 54 and 55. As shown in Figure 6, the axles are fixed on a supporting plate 57 attached to the cassette holder carriage frame 39 by means of screw 34. The shank portion 59 of the axle extending through plate 57 and fixed therein is of smaller diameter than the portion of the axle surrounded by clock spring 50, such that the annular shoulders between the shank and axle portions provides a supporting surface bearing against the plate 57 when machine nut 60 is turned tightly on the threaded portion of the shank projecting through the hole 58 in plate 57 and washer 61 between nut 60 and plate 57.

The circular spring boxes 52 and 53, of which 52 is illustrated in greater detail in Figure 6, are secured to circular pinion gears such as gear 62 for spring box 52 by any suitable mode of attachment, as for example, by means of rivets 63, such that rotation of the spring box 52 as a result of the spring 50 being wound taut, causes rotation of pinion gear 62 and the force applied thereby is transmitted to rack 64 fixedly mounted on the cassette holder 28. The resulting force urged through spring 50 causes the cassette holder to be lifted or moved vertically when the spring is wound in the proper direction to apply the resulting force vertically upward. A stop member, as hereinafter described determines the extent of vertical motion of the cassette holder in the carriage frame, depending upon the desired position of the exposure on the film plate.

A similar rack and pinion gear arrangement is provided for horizontal movement of the cassette holder carriage frame 39 from the loading position to one of the possible multiple active positions of the cassette before the beam of X-rays. Thus, clock spring box 53 is attached to pinion gear 65 revolving on axle 55 and the teeth of gear 65 engage horizontal rack 66 secured to the interior, bottom side of the housing 2 such that force applied to gear 65 by means of clock spring 51 is transmitted to rack 66, causing the cassette carriage frame to move horizontally in the direction it is urged, as determined by the direction of winding the clock spring.

From the design and structure of the clock spring motors 50 and 51 in which the inner ends of the springs are attached to stationary axles 54 and 55, respectively, and the outer ends are fixed to the spring cases 52 and 53 which in turn are riveted to pinion gears 62 and 65, the entire assembly being rotatable about axles 54 and 55, it is evident that a greater moment of force is thereby exerted by the springs than in the design whereby the gears rotate with the axles and the force is applied at the center ends of the springs. Although the fixed axle-rotating spring case arrangement herein provided is preferred for the purpose intended in the present apparatus, the rotating axle arrangement may also be utilized as an alternative form of the mechanism, particularly when a larger spring is employed to provide the force necessary to raise the cassette holder to the required height.

Figure 4:
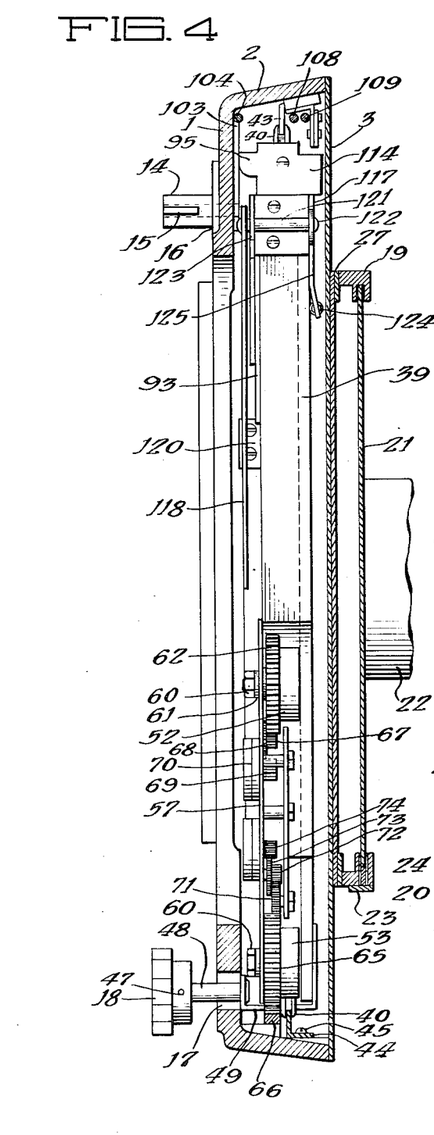
Figure 4 is a cross-sectional view of the apparatus as viewed horizontally from section line 4—4 of Figure 3.

The vertical movement of the cassette holder and the horizontal movement of the cassette holder carriage frame are desirably inhibited by suitable speed governor means actuated by the revolution of the respective pinion gears 62 and 65. Of the various governors suitable for use in the present apparatus an effective arrangement for controlling the speed of travel of the cassette holder and its carriage frame is illustrated in Figures 3 and 4, comprising a gear train for multiplying the rotational speed of a differential governor. Thus, pinion gear 62 drives gear 67 of smaller diameter which is fixed and centered on the same axle as gear 68 of larger diameter and the latter, in turn, drives the small diameter gear 69 attached to the shaft of the differential governor 70. The governor comprises a rotatable flywheel having a braking arrangement within the governor housing 70 which controls predetermined excessive rotational speed of the pinion gear 62 as the clock spring motor unwinds. A similar gear train and fly-wheel governor is provided for pinion gear 65, the latter engaging idler gear 71 meshing with gear 72 of smaller diameter which is fixed to a common axle, driving gear 73 and the latter in turn drives gear 74 attached to the governor fly-wheel. By suitable braking adjustment of the fly-wheel in the governor, the vertical thrust of the gear 62 on rack 64 fixed to the cassette holder is controlled and when suddenly stopped by engagement of the vertical motion stop mechanism, the momentum of the thrust is minimized by means of said vertical speed governor. By thus controlling the speed of the vertically moving cassette holder, the vibration of the apparatus after vertical motion of the cassette holder has ceased is substantially eliminated. Likewise, the horizontal speed of the relatively massive cassette holder carriage frame is controlled, such that upon engagement of the carriage frame with the horizontal stop mechanism, the sudden interruption of motion and the play of momentum does not cause the apparatus to vibrate and delay exposure of the cassette film.

The vertical and horizontal cassette motion stop mechanism hereinabove referred to comprises a combination of a cassette holder vertical position selector, a carriage frame horizontal position selector, (the horizontal position of the carriage frame also determining the horizontal position of the cassette) and means responsive to said position selectors for transferring the combination of vertical and horizontal selections to cassette stop elements arranged and positioned to communicate with catch projections mounted on the cassette holder and on the cassette holder carriage frame. The general assembly and correlationship of the above cassette position selector and stop elements as cooperating members of the assembled apparatus is illustrated in Figure 3 and more specifically in Figures 9 to 14, the latter representing sectional views of functional units of the apparatus which occupy and operate in various portions of the apparatus. The unit of the combination which determines the vertical and horizontal positions which the cassette and its contained photographic film plate will occupy before the shutter of the X-ray unit comprises a pair of cam wheels 75 and 76 keyed to rotatable axle 77 which in turn is journalled in bearings at either end of the axle or at both ends thereof, supported in fixed relationship to the housing by any appropriate means, such as the U-shaped enclosing frame 78 for the cassette position selector mechanism attached to the housing. The bearings for axle 77 are provided by apertures in the arms of the U-shaped enclosing frame 78 illustrated in the accompanying drawings. The cam wheels 75 and 76 are suitably fabricated from sheet metal with cam projections such as 79 on the periphery of the wheel which translate circular motion of the cam wheels into linear motion of the cam followers 80 and 81 imparted thereto by the cam projections on said cam wheels 75 and 76 respectively. The cam followers may be of any suitable design, such as a pin, a bar, or a wheel, as, for example wheels 80 and 81 fixed to or rotatably mounted on bars 82 and 83, respectively. The cam followers 80 and 81 are urged against the cam projections on the periphery of cam wheels 75 and 76 and follow the periphery of the wheels as the latter rotate, by any desirable means, as, for example, by the pull of stretched spiral springs 84 and 85, each spring having one end thereof attached to the bars 82 and 83 and the opposing ends thereof attached to the fixed enclosing frame 78 or to the housing wall. Each of the bars 82 and 83 are rotatable on or pivoted at their lower ends below the point of attachment of the cam follower to axle 86 fixed or journalled in the selector mechanism enclosing frame 78. The axle 86 thereby provides a fulcrum at the lower ends of bars 82 and 83 about which said bars pivot. When force is applied to the cam followers at points intermediate the ends of the bars 82 and 83 by virtue of the pressure exerted thereon from cam projections 79 as the cam wheels 75 and 76 are rotated, the bars 82 and 83 pivot about the fulcrum point on axle 86 through an arc predetermined by the distance from the periphery of the cam projection to the bottom of the cam depressions on the cam wheels. Cam wheels 75 and 76, both keyed to the same rotatable shaft or axle rotate simultaneously as axle 77 is rotated and upon each partial rotation of the cam wheels 75 and 76, the combination of cam projections and cam depressions on each of the wheels determines the setting of the cassette holder and cassette holder carriage frame stop elements which in turn determines the extent of their respective vertical and horizontal movements, as hereinafter described in greater detail.

The rotation of axle 77 which rotates cam wheels 75 and 76 keyed thereto and brings into play the various cam projections and depressions on the periphery of said wheels is caused by rotation of ratchet wheel 87, likewise keyed to axle 77, such that rotation of ratchet wheel 87 causes a corresponding and simultaneous rotation of cam wheels 75 and 76. Ratchet wheel 87 is caused to rotate by upward pressure applied on the bottom of the ratchet teeth such as tooth 1 by lifter pawl 88 which is rotatable through a limited arc determined by depressor spring 89, to accommodate the pitch of the ratchet teeth as the pawl is drawn downward over the teeth. Both the pawl and spring may be connected to the same member such as lifter bar 90, the pawl being rotatably attached thereto on a suitable axle, not illustrated. The depressor spring is fixedly attached at one of its ends to bar 90 by means of an anchor pin 91, illustrated in Figures 9 and 14. The pawl 88 is urged upwardly against the teeth on ratchet wheel 87 by the upward pull of extended spring 92 anchored at one of its ends to the inner surface of housing 1 and at the other of its ends to the pawl lifter bar 90, preferably at the approximate extremity of bar 90, opposite the axle 77 on which bar 90 is freely rotatable. A detent or click pawl such as 93, fixed to flexible arm 9 which in turn is attached to enclosing frame 78 is desirably provided in the assembly to prevent clockwise rotation of ratchet wheel 87 as pawl 88 is dragged over the ratchet wheel teeth when lifter bar 90 is rotated clockwise or downwardly about axle 77. The detent 93 also provides an audible click when bar 90 is depressed sufficiently for the detent to slide under the next ratchet tooth on the periphery of ratchet wheel 87, the click informing the fluoroscopist that the mechanism is cocked for the next setting of the cassette positioning units of the apparatus.

Figures 9, 10, 11, 12, 13, 14:
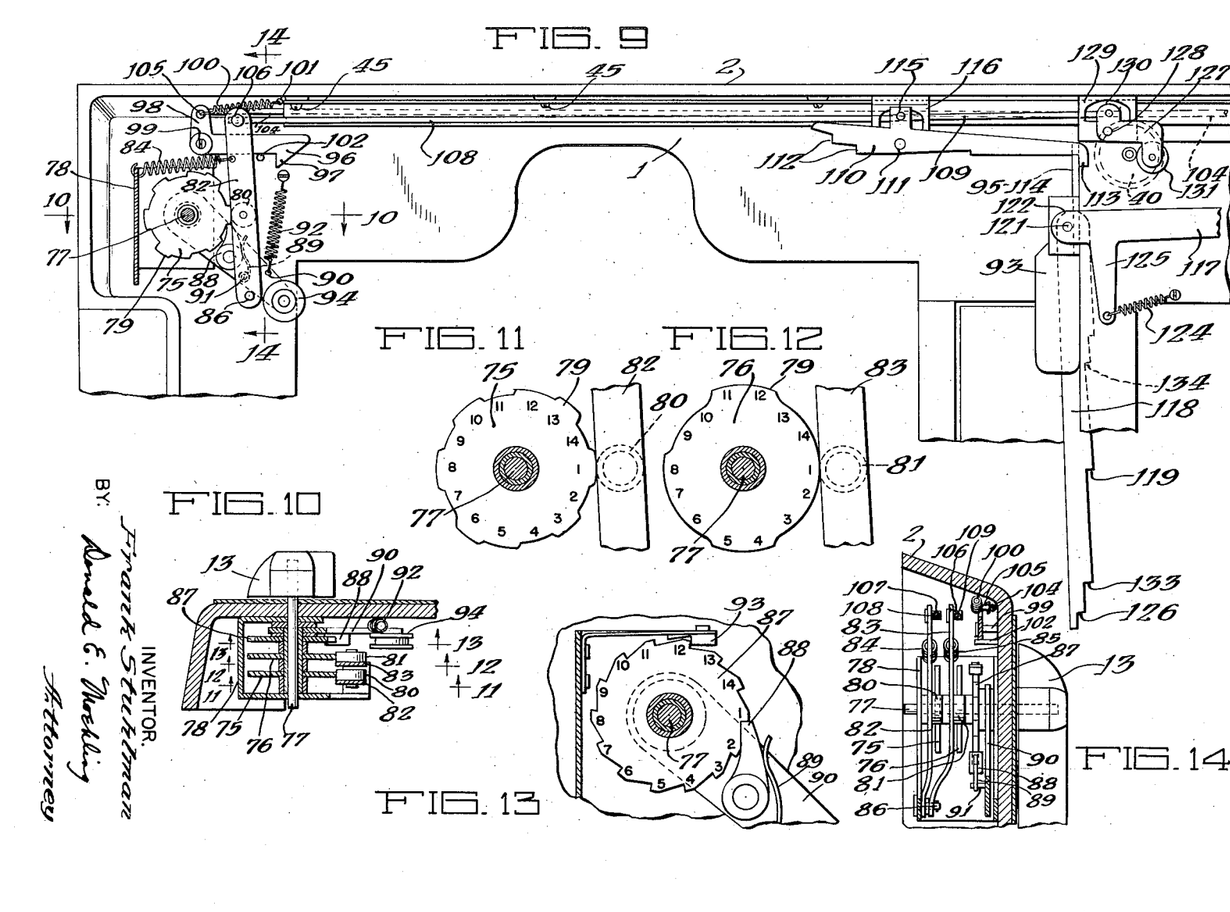
Figure 9 is a more detailed illustration of the cassette-position control assembly illustrated in combination with other operating parts of the apparatus in Figure 3.
Figure 10 is a vertical view downward from horizontal section line 10—10 of Figure 9.
Figures 11, 12, and 13 are views taken from section lines 11—11, 12—12 and 13—13 of Figure 10 illustrating the various parts of the control mechanism, otherwise inaccessible to the eye when the composite arrangement is viewed from a frontal elevation.
Figure 14 is a side view of the control mechanism when viewed from section line 14—14 of Figure 9 and more clearly and specifically illustrates certain portions of the mechanism ordinarily hidden from view in a simple frontal elevation of the mechanism.

The number of teeth on ratchet wheel 87 and the number of activating cam projections and depressions on cam wheels 75 are determined by the number of different active positions the cassette is to occupy before the compression cone and the X-ray beam. In order to provide a sufficient number of cassette position settings on cam wheels 75 and 76 to make possible all of the various combinations of vertical and horizontal positions which the cassette can permissibly occupy, each cam wheel must be provided with 14 position-determining projections and depressions, one for each of the following cassette positions: the (1) position for full exposure of the cassette or film plate with the longitudinal axis of the latter aligned horizontally in its holder, the (2) and (3) positions for exposure of the left and right vertical halves of the plate placed with its longitudinal axis horizontal in its holder, that is, the halves comprising quadrants B and D and quadrants A and C, indicated in Figure 3, the (4), (5), (6) and (7) positions for separate exposures of each quadrant, A, B, D, and C in succession with the longitudinal axis of the cassette aligned horizontally in its holder, the (8) position for full exposure of the film plate when the latter is placed with its longitudinal axis in vertical relationship to the cassette holder, the (9) and (10) positions for exposure of the right vertical half A—B and the left vertical half C—D of the cassette, and the (11), (12), (13) and (14) positions for successive exposure of the quadrants A, C, B and D in the named order with the longitudinal axis of the cassette aligned vertically in the cassette holder. As indicated by the numbers 1 to 14 on cam wheels 75 and 76 and on ratchet wheel 87, the rotation of the ratchet wheel determines which of the indicated cam projections 1 to 14 is to communicate with the corresponding cam followers and activate bars 82 and 83 simultaneously and in a regular order of succession as the ratchet wheel is successively cocked each time by rotation through one-fourteenth of its circumference. The position the cassette will occupy when the cassette holder carriage frame is released from its loading or idle position to assume its active centered position before the X-ray beam following each successive change in rotational position of the ratchet wheel, as indicated audibly to the fluoroscopist by the click of detent 89, may be desirably indicated visually to the fluoroscopist; a suitable visual means of indication for this purpose is illustrated in Figures 1 and 14 comprising a combination of axle 77 to which ratchet wheel 87 and pointer 13 is also keyed on the end of axle 77 projecting through the front face of the housing, such that rotation of ratchet wheel 87 simultaneously causes rotation of the pointer. Each change of position of the ratchet wheel, resulting in a simultaneous change in the cassette positioning means is registered by the pointer on dial 12 fixed to the front face of the housing observable by the fluoroscopist. The dial may contain appropriate markings thereon or code designations indicating the position the cassette will occupy in its active position, responsive to the portion of the cassette positioning elements hereinabove partially described.

Lifter arm 90 which raises pawl 88 into a lifting position against the teeth of the ratchet wheel 87 causes an aliquot fractional part of the rotation of the latter, depending upon the number of equally spaced teeth on the perifery of wheel 87. Lifter arm 90 is deflected downwardly against the tension of spring 92 into a "cocked" position when the fluoroscopist applies lateral pressure on knob 18 which forces the cassette carriage frame from its spent active position before the fluorescent screen, compression cone and X-ray beam to its loading or idle position, the lifter bar being forced downwardly or "cocked" when the depressor cam 93 fixedly mounted on the forward edge of the cassette holder carriage frame engages wheel 94 rotatably mounted on lifter arm 90. Although member 94 is suitably and preferably a grooved wheel designed to retain in position the vertical edge of the depressor cam 93 by enclosing both sides of the cam's edge within the groove on the perifery of wheel 94, other obvious arrangements for this purpose are suitable, such as a pin projecting perpendicularly from arm 90. When the cassette holder carriage frame 39, is moved laterally via force applied by the fluoroscopist on knob 18, connected by pin 48 to the carriage frame, the pinion gear 65, which engages rack 66 fixedly mounted to the housing, likewise turns and winds clock spring 51 until further lateral movement of the carriage frame is halted by a suitable stop, such as the extreme left end of slot 17 which engages pin 48 connected to the cassette holder carriage frame. As the pin 48 approaches this stop in the lateral movement of frame 39, depressor cam 93 engages the grooved wheel 94 on lifter arm 90, depressing the latter arm into its "cocked" position. The carriage frame is also equipped with a catch projection 95 fixedly mounted on the frame and extending horizontally in the housing or perpendicularly with respect to the flat side of the cassette carriage frame. The catch projection 95 is positioned on the carriage frame and is designed to slide under the bevelled forward edge of a detent arm fabricated into an inverted bell crank lever having a substantially horizontal arm 96 containing a downwardly projecting detent 97 and a substantially vertical lever arm 98. The detent arm pivots about a suitable fulcrum, such as axle 99 intermediate the extremities of arms 96 and 98 against the tension exerted by spiral spring 100 which is attached to the end of the lever arm 98 opposite the detent 97 at the end of horizontal arm 96. The spring 100 is maintained in a stretched condition by connecting the opposite end to a point of attachment on the housing, as at 101. The detent catch 97 of horizontal detent arm 96 has a forward bevelled edge and the arm is maintained in an approximately horizontal plane against the tension of spring 100 tending to force the arm downwardly by means of a stop pin 102 appropriately positioned under the lower edge of the horizontal detent arm 96. As the cassette holder carriage frame 39 is moved horizontally to the loading or idle position, the catch projection 95 on the carriage frame ultimately engages the bevelled edge of the detent arm forcing the inverted bell crank lever arm to rotate about fulcrum axle 99 until the catch projection on the carriage frame passes the apex of the bevelled detent 97, permitting the tension exerted by spring 100 to force the substantially horizontal arm 96 downward and to carry the rear retaining edge of the detent 97 behind the catch projection 95 on the carriage frame. When retained in this position, against the horizontal force urged by the clock spring motor through pinion gear 65 and rack 66, the cassette holder may be loaded with a cassette for a succeeding exposure or series of exposures, following release of the carriage frame from its idle position.

The release of the carriage frame is accomplished by means of a trigger mechanism operable at the will of the fluoroscopist from a position on the exterior of the housing, preferably from the front of the apparatus, thereby requiring no shift in the fluoroscopist's position in front of the fluorescent screen, the trigger handle being mounted on a readily accessible portion of the apparatus. A trigger mechanism having such features is illustrated in Figures 1, 3 and 4 of the accompanying drawings, comprising a handle 14 fixed to rotatable axle 15 which is journalled in the bearing plate 16 and the housing 1. The axle 15 extends through the housing walls into the inner enclosure of the housing and is attached therein to trigger 103 which extends upwardly and releasably contacts at its upper tip a rod 104 which is relatively rigid and incompressible, serving as a connecting means from trigger 103 to the inverted bell crank lever arm hereinabove described and comprising detent 97 releasably holding the carriage frame in its loading position while the cassette is inserted therein. Thus, when handle 14 is depressed downwardly, as for example, from position "a" to depressed position "b," indicated in Figure 3 by broken line outlines of handle 14, trigger 103 rotates counterclockwise on axle 15 engaging the end of connecting rod 104. The latter rod is slidably mounted in supports fixed to the housing wall and is attached at its opposite end to the upright arm 98 extending upwardly from axle 99. The connecting rod 102 is attached to the substantially vertical lever arm 98 of the detent arm by any suitable fixing means, as for example, by the means illustrated in Figure 14, comprising a pin 105 projecting horizontally from arm 98 through an opening in connecting rod 104 and is held in place therein by means of cotter pin 106. The force applied by trigger 103 on rod 104 is thus transmitted to the vertical arm 98 of the detent arm, causing horizontal arm 96 thereof to raise until detent 97 disengages from the catch projection 95 on the cassette carriage frame and releases the latter for movement horizontally from its idle or loading position to one of its active positions where exposure of the cassette is obtained in the beam of X-ray radiations.

The particular horizontal and vertical active positions which the cassette carriage frame and cassette holder will assume after release of the carriage frame from its loading position are determined by the projections and depressions on cam wheels 75 and 76 which cause clockwise and counterclockwise rotation, respectively, of bars 82 and 83 which are attached at their upper extremities to connecting rods suitable for transmitting vertical and horizontal cassette positioning selections to elements on the cassette holder and cassette carriage frame responsive thereto, as hereinafter specified. Rods 82 and 83 at the aforesaid upper extremities thereof contain outwardly extending pins 106 and 107, respectively, which project through openings in connecting rods 108 and 109 respectively, attaching thereto by any suitable means designed and adapted to maintain rods 108 and 109 in horizontally fixed position relative to pins 106 and 107. Connecting rod 108 extends from bar 82 to horizontal cassette positioning means illustrated as a substantially straight rocker arm 110 rotatable on rocker shaft 111 and containing stepped shoulders such as 112 and a cassette carriage frame catch 113 at the extreme end of the rocker arm extending vertically downward, said shoulders 112 and catch 113 being designed and adapted to engage cassette carriage frame stop projection 114 fixed to the carriage frame in such position that the horizontal projecting edge thereof perpendicular to said frame passes under the rocker arm 110 without interference when the carriage frame is moved horizontally to its loading position but which engages one of the shoulders 112, or catch 113, depending upon the setting determined by cam wheel 75, when the cassette carriage frame is released from its idle position and moved to the right side of the housing into one of the active positions. Lateral movement of connecting rod 108 in either direction, determined by the settings on cam wheel 75, causes rotation of substantially straight rocker arm 110, by attachment of connecting rod 108 to a vertical extension of arm 110 over rocker shaft 111, for example by means of a pin 115 attached to said vertical extension. The shaft 111 is rotatable in a suitable mounting therefor such as 116 extending downwardly from the side wall of housing 2 to which said mounting is attached.

Vertical movement of the cassette holder 28 in cassette carriage frame 39 is controlled and its setting in the frame before the beam of X-rays is determined by the cooperative functioning of the cassette positioning cams on cam wheel 76, bar 83 responsive thereto, connecting rod 109 which transmits the particular cam wheel setting to cassette vertical position determining means comprising, in the embodiment illustrated on the accompanying drawings, an L-shaped bell crank lever having a substantially horizontal arm 117 and a substantially vertical arm 118 containing stop projections fabricated therein such as stepped shoulders 119 which are designed and adapted to engage a cassette holder stop spur 120 projecting from the left vertical side of the cassette holder frame. The substantially horizontal and vertical arms respectively of the L-shaped bell crank lever are fixedly attached to axle 121 rotatably mounted in journal bearings 122 and 123 attached to the side of the cassette holder carriage frame. Horizontal arm 117 is maintained at the zenith of its raised position when not forced downward therefrom by means of spring 124 attached at one of its ends to vertical leg 125 extending downwardly from arm 117 and at the other of its ends to the cassette carriage frame.

The horizontal arm 117 of the bell crank lever is rotatable downwardly or clockwise against the counter-action of spring 124, causing corresponding clockwise rotation of vertical arm 118 of the bell crank lever both arms 117 and 118 being attached to a common rotatable axle, 121. The mechanism for vertical movement of the cassette holder is "cocked" by forcing the cassette holder to its lowermost vertical, active position usually accomplished by the fluoroscopist pushing the cassette holder downwardly within the cassette holder carriage frame as far as possible and thereafter allowing the cassette holder to rise until the stop spur 120 on the cassette holder engages the lowermost shoulder 126 on the vertical arm 118. The clock spring motor 50 is wound to maximum tautness and exerts its greatest upward pressure against the stop spur when the cassette holder is pushed to its lowermost position in the cassette carriage frame. By clockwise rotation of horizontal arm 117 of the bell crank lever, the vertical arm 118 is also caused to rotate clockwise until shoulder 126 is disengaged from the stop spur 120, whereupon the clock spring motor 50, through pinion gear 62 and rack 64 attached to the cassette holder urges the cassette holder and the film plate it contains to a vertically higher shoulder on arm 118, not necessarily the shoulder immediately above shoulder 126, but determined by the extent of the clockwise rotation of arm 118 away from the stop spur 120 attached to the cassette holder.

The extent of clockwise rotation of arm 118 away from the stop spur 120, thereby determining the extent of the permissible vertically upward movement of the cassette holder is regulated initially by the cam projections and indentations on the perifery of cam wheel 76. The cam follower 81, mounted on bar 83, responds to the lateral force caused by the projections on cam wheel 76 pushing against the cam follower as the wheel rotates, contact between these elements being maintained through the tension of spring 85 urging cam follower 81 on bar 83 against the cam wheel. Bar 83 and connecting rod 109 attached thereto likewise move laterally in concurrence with the lateral movement of the cam follower 81 induced by the cam projections and indentations on cam wheel 82. The resulting linear movement of connecting rod 109 is transmitted directly to the fulcrumed rocker arm 127, also in the form of an inverted bell crank lever, rotatable about axle 128 which is mounted on a fixed support therefor, such as 129 attached to the interior surface of the housing. The rocker arm 127 is illustrated as an L-shaped bar having a vertical arm extending above the axle 128 to which connecting rod 109 is rotatably attached, for example, by means of a pin 130 extending from the vertical arm through a hole in rod 109 such that lateral movement of rod 109 causes rocker arm 127 to rotate about axle 128. Another arm extending horizontally from axle 128 has a depressor wheel 131 attached to the end thereof in slidable, communicating relationship with horizontal arm 117 of the bell crank lever which determines the vertical setting of the cassette holder. The depressor element may also suitably comprise merely a pin projecting perpendicularly from the horizontal arm 117. In order to obtain positive contact of depressor wheel 131 with arm 117, the wheel is desirably grooved around its perifery and arm 117 contains an upwardly extending plateau 132 illustrated in Figure 3, which falls into the periferal groove on wheel 131. When the pin 130 is at the extreme left in the fixed support 129, corresponding to the utmost retraction of rod 109 to the left of axle 128, depressor wheel 131 is lifted a maximum distance vertically, engages the plateau 132 of arm 117 and depresses arm 117 only a small distance causing arm 118 to swing out laterally only a short distance and shoulder 133 engages the stop spur 120 as the cassette holder moves vertically upward. When pin 130 is directly over axle 128, arm 118 swings out laterally sufficient only for shoulder 119 to engage the stop spur 120. Movement of pin 130 to the extreme right of axle 128 causes a corresponding shift in the position of arm 118 and the stop spur 120 on the cassette holder engages shoulder 134 on arm 118, thereby permitting vertical motion of the cassette holder to a correspondingly higher vertical position.

Obvious mechanical equivalents for the apparatus illustrated and described above may be readily apparent to machinists and to others skilled in the art, but of the many alternative arrangements of the operating mechanism and of the obvious substitutable mechanical equivalents, the apparatus illustrated in the accompanying drawings represent an operable and efficient assemblage of cooperating units satisfactory for the purpose intended.

I claim as my invention:

1. A spot film tunnel apparatus adapted to obtain multiple, successive photographic exposures in separate portions of a photographic film, comprising a housing, a cassette holder carriage frame movable horizontally in said housing, a cassette holder movable vertically in said carriage frame, a rotatable cam wheel, a cam follower maintained in contact with the cams of said wheel whereby rotation of said cam wheel causes lateral motion of said cam follower, means connecting said cam follower with rocker arms pivotally mounted in said housing and having stepped shoulders on said arms positioned and adapted to communicate with said cassette holder and said cassette carriage frame to determine horizontal and vertical movement of said cassette and its contained photographic film relative to said source of X-ray radiation.

2. The apparatus of claim 1 further characterized in that said rocker arm comprises a pivotally mounted bell crank lever having a substantially horizontal arm communicating with a depressor lever arm responsive to lateral movement of said cam follower and a substantially vertical arm containing said stepped shoulders adapted to releasably stop vertical motion of said cassette holder in at least one active, vertical position with respect to said source of X-ray radiation.

3. The apparatus of claim 1 further characterized in that said rocker arm comprises a substantially horizontal fulcrumed lever arm responsive to lateral movement of said cam follower and having stepped shoulders thereon adapted to releasably stop horizontal motion of said cassette carriage frame in at least one active, horizontal position with respect to said source of X-ray radiation.

4. The cassette positioning means of claim 1 comprising said cam wheel axially fixed to a rotatable axle journalled in said housing, a ratchet wheel axially fixed to said rotatable axle having a number of periferal ratchet teeth corresponding to the number of horizontal and vertical active positions of said cassette relative to said source of X-ray radiation, a pawl mounted on a depressable ratchet lifter arm rotatable about said axle and communicating with said ratchet teeth, means urging said lifter arm to a raised position, a lifter arm depressor cam mounted on said cassette carriage frame positioned thereon and designed to depress said pawl a distance determined by the space between succeeding teeth on said ratchet wheel.

5. The apparatus of claim 1 comprising in combination therewith a pair of spaced, horizontal rails mounted in said housing and a pair of spaced, vertical rails mounted in said frame, rollers on said frame suspended on and maintained in track on said horizontal rails, and rollers on said cassette holder maintained in track on said vertical rails whereby horizontal movement of said frame and vertical movement of said cassette holder are obtained on said horizontal and vertical rails, respectively, during operation of said apparatus.

6. A spot film tunnel apparatus adapted to obtain multiple, successive photographic exposures in separate portions of a photographic film, comprising a housing, a cassette holder carriage frame movable horizontally in said housing, a cassette holder movable vertically in said carriage frame, rotatable cam wheels in said housing having cams maintained in contact with corresponding pivoted cam follower arms, a connecting rod rotatably attached to each of said cam follower arms and to pivoted vertical and horizontal cassette positioning rocker arms whereby lateral movement of the cam follower arms is transferred by the connecting rods to the rocker arms, causing pivoted rotation of said rocker arms, said vertical cassette positioning rocker arm having stepped shoulders thereon adapted and designed to releasably catch a spur mounted on said vertically movable cassette holder and designed to stop said cassette holder in one of its vertical, active positions with respect to said source of X-ray radiation, and said horizontal cassette positioning rocker arm having stepped shoulders thereon adapted and designed to releasably catch a stop projection on said cassette carriage frame, thereby determining movement of said frame to one of its horizontal, active positions with respect to said source of X-ray radiation.

7. A spot film tunnel apparatus adapted to obtain multiple, successive photographic exposures in separate portions of a photographic film, comprising a housing, a cassette holder carriage frame movable horizontally in said housing, a cassette holder movable vertically in said carriage frame, a motor connected in driving relationship to a rotatable pinion gear axially mounted on said cassette holder and a vertical rack fixedly mounted on said cassette carriage frame, the teeth of said rack being in meshed relationship with the teeth of said pinion gear.

8. The apparatus of claim 7 further characterized in that said motor comprises a helical spring fixedly attached at one end to said cassette holder and attached at its other end to said rotatable pinion gear.

9. The apparatus of claim 8 further characterized in that the rotational speed of said pinion gear is limited to a predetermined maximum as fixed by a rotational speed governor driven by said pinion gear.

10. A spot film tunnel apparatus adapted to obtain multiple, successive photographic exposures in separate portions of a photographic film, comprising a housing, a cassette holder carriage frame movable horizontally in said housing, a cassette holder movable vertically in said carriage frame, a motor connected in driving relationship to a pinion gear axially mounted on said frame and a horizontal rack fixedly mounted in said housing, the teeth of said rack being in meshed relationship with the teeth of said pinion gear.

11. The apparatus of claim 10 further characterized in that said motor comprises a helical spring fixedly attached at one end to said frame and attached at its other end to said rotatable pinion gear.

12. The apparatus of claim 11 further characterized in that the rotational speed of said pinion gear is limited to a predetermined maximum as fixed by a rotational speed governor driven by said pinion gear.

13. In a spot film tunnel comprising a housing, a cassette holder movable in said housing, and a cassette horizontal position control means within said housing, the improvement of said spot film tunnel which comprises a cassette carriage frame horizontally movable in said housing containing said cassette holder vertically movable therein, a bell crank lever having substantially horizontal and substantially vertical arms rotatable about a pivot fixed to said cassette holder, stepped shoulders on said substantially vertical arm for determining vertical motion of said cassette holder in said frame, a rotatable depressor arm communicating with said substantially horizontal arm of said bell crank lever, a substantially straight rocker arm pivotally connected to said housing and containing stepped shoulders which determine horizontal motion of said carriage frame, a cassette vertical motion stop spur fixed to said cassette holder and adapted to communicate with the stepped shoulders on the vertical arm of said bell crank lever, a carriage frame horizontal stop projection fixed to said frame and adapted to communicate with the stepped shoulders of said substantially straight rocker arm, means urging horizontal motion of said frame and vertical motion of said cassette holder in said frame, an axle rotatable in said housing, a first cam wheel keyed to said axle and having periferal cam projections thereon, a second cam wheel keyed to said axle and having periferal cam projections thereon, a ratchet wheel keyed to said axle, a click pawl pivotally mounted on a ratchet wheel lifter arm designed and positioned to communicate with a depressor cam mounted on said cassette carriage frame, means urging said lifter bar to a raised, depressable position, a first cam follower bar rotatable about a fixed pivot at one end of said bar and communicating with said first cam wheel projections, a second cam follower bar rotatable about a fixed pivot at one end of said bar and communicating with said second cam wheel projections and means connecting said first and second cam follower bars to said rocker arm and to said bell crank lever respectively, said cam wheel projections determining particular shoulders on said rocker arm and the vertical arm of said bell crank lever communicating with the carriage frame stop projection and the cassette holder stop spur respectively.

References Cited in the file of this patent

UNITED STATES PATENTS

| Number | Name | Date |
| --- | --- | --- |
| 2,327,603 | Kizaur | Aug. 24, 1943 |
| 2,552,858 | Mueller et al. | May 15, 1951 |
| 2,560,782 | Scholz | July 17, 1951 |